Patented Feb. 2, 1932

1,843,332

UNITED STATES PATENT OFFICE

KARL MARX AND HANS WESCHE, OF DESSAU IN ANHALT, GERMANY, ASSIGNORS TO WINTHROP CHEMICAL COMPANY, INC., OF NEW YORK, N. Y., A CORPORATION OF NEW YORK

INSECTICIDE

No Drawing. Application filed July 5, 1928, Serial No. 290,698, and in Germany May 9, 1928.

The invention relates to improved insecticides and is based on the observation that the esters of oxalic acid and the derivatives and substitution products of these esters are very effective in destroying insects. It has been stated that they even act against muscarians, for instance musca domestica, stomaxys calcitrans. As known in the art, insects of this kind are very resistant against the action of the synthetic insecticides. The said esters may be applied in any desired manner, for instance by scattering in conjunction with the usual diluents or vehicles or by spraying in form of a solution in an organic solvent or in form of an aqueous emulsion prepared in the known manner.

The oxalic acid esters may be mixed with other insecticides. Natural products containing effective insecticides, for example pyrethrum, may be extracted with the esters and the extract may be applied in the manner described above. Extracts of this mentioned natural product prepared with other solvents may be mixed with oxalic acid esters. By addition of a viscous oil, for instance paraffine oil, to the spraying preparations the finely sprayed substance remains for a long time suspended in the air.

The esters are effective in killing insects, even when applied in very small quantities. When using oxalic acid diethyl ester, a quantity of 1–2 ccm. sprayed in 1 cbm. of the room is sufficient to destroy completely even many flies which are not killed by other well known preparations. Similar effects are obtained by a preparation made by mixing an ester of oxalic acid with an extract of pyrethrum in any solvent.

To prepare an emulsion especially for combatting bugs and lice 5 parts of oxalic acid ethyl ester are mixed with 5 parts of butyl alcohol and to the mixture are added 15 parts of an emulsifying preparation, for instance a solution of 50 per cent. strength of the sodium salt of dibutylnaphthalenesulfonic acid. The mixture is then diluted with water to form 100 parts. An emulsion of 2 per cent. strength of this stock preparation yields an excellent spraying agent.

It is obvious to all skilled in the art that our present invention is not limited to the details mentioned above. Instead of oxalic acid diethyl ester there may be used other esters of the oxalic acid, for instance the dimethyl ester.

What we claim is:

1. An insecticide containing as an active constituent an aliphatic ester of oxalic acid.
2. An insecticide containing as an active constituent oxalic acid diethyl ester.
3. An insecticide containing as an active constituent oxalic acid dimethyl ester.

In testimony whereof, we affix our signatures.

KARL MARX.
HANS WESCHE.